United States Patent [19]

Wedemeyer

[11] Patent Number: 4,993,732

[45] Date of Patent: Feb. 19, 1991

[54] DETACHABLE MANUAL PROPULSION SYSTEM

[76] Inventor: Helmut M. R. Wedemeyer, Salmon Arm, Canada

[21] Appl. No.: 347,457

[22] Filed: May 4, 1989

[30] Foreign Application Priority Data

Aug. 22, 1988 [CA] Canada .................................. 575348
Nov. 15, 1988 [CA] Canada .................................. 583156

[51] Int. Cl.[5] .............................................. B62M 1/16
[52] U.S. Cl. .................................. 280/250.1; 280/256
[58] Field of Search ..................... 280/210, 211, 242.1, 280/244, 245–250.1, 253, 256, 304.1; 301/104, 74, 60, 58

[56] References Cited

U.S. PATENT DOCUMENTS

| | | | |
|---|---|---|---|
| 1,479,694 | 1/1924 | Bleado | 301/104 |
| 1,600,131 | 9/1926 | Overton | 280/250.1 |
| 3,309,110 | 3/1967 | Bulmer | 280/244 |
| 3,623,748 | 11/1971 | Haynes | 280/250.1 |
| 3,666,292 | 5/1972 | Bartos | 280/247 |
| 4,354,691 | 10/1982 | Saunders et al. | 280/244 |
| 4,453,729 | 6/1984 | Lucken | 280/244 |
| 4,500,102 | 2/1985 | Haury et al. | 280/304.1 |
| 4,648,619 | 3/1987 | Jungnell et al. | 280/250.1 |
| 4,762,332 | 8/1988 | Seol | 280/244 |

FOREIGN PATENT DOCUMENTS

| | | | |
|---|---|---|---|
| 2417662 | 10/1975 | Fed. Rep. of Germany | 280/247 |
| 0254541 | 7/1926 | United Kingdom | 280/247 |

*Primary Examiner*—Charles A. Marmor
*Assistant Examiner*—Victor E. Johnson
*Attorney, Agent, or Firm*—Eckert Seamans Cherin & Mellott

[57] ABSTRACT

The present invention provides a manually operable propulsion unit for the detachable attachment to a wheelchair in which the wheels are arranged to be driven by circular hand rails fixedly attached to, concentric with and laterally spaced outside the wheels of the wheelchair so as to facilitate manual propulsion of the wheelchair by means of the back and forwards motion of hand levers in addition to the wheelchair being propellable directly by the hand rails. The manually operatable propulsion unit is detachably attachable to the wheelchair and suitably comprises a pair of crossbars each adapted to be detachably attached dimetrically across one of the handrails, basebar means adapted to be detachably attached transversely of the frame of the wheelchair, a pair of hand lever bars pivotably mounted about a horizontal axis on the basebar means on either side of the wheelchair, a pair of mounting means each on one of said crossbars extending across the hand rail and a pair of connecting bars each pivotably mounted at either end to said mounting means at a point off-center from the center of the hand rail and to an intermediate point on the hand lever bar such that the back and forwards motion in the vertical plane of each of the hand lever bars drives its associated wheel of the wheelchair via the attached hand rail. The present invention also provides a conversion kit which on erection provides said unit.

57 Claims, 4 Drawing Sheets

DETACHABLE MANUAL PROPULSION SYSTEM

FIELD OF INVENTION

The present invention relates to a wheelchair in which the wheels are arranged to be driven by circular hand rails fixedly attached to, concentric with and laterally spaced outside the wheels of the wheelchair. In particular the present invention relates to a manually operable propulsion unit for the detachable attachment to such a wheelchair which allows the occupant of the wheelchair to propel the wheelchair by means of the backwards and forwards motion of a hand lever in addition to the direct drive by means of the hand rails. The present invention also provides a conversion kit which on erection provides said unit as well as a wheelchair equipped with said unit.

BACKGROUND OF INVENTION

The normal propulsion of a wheelchair is accomplished by pushing a hand rail attached to the main wheels, or using a hand lever device or using an electric motor. The steering of the wheelchair is accomplished either by a steering mechanism, or by individually braking the motion of the two main wheels by hand and in such sequence as to change the direction of the wheelchair. Such wheelchairs are disclosed, for example in U.S. Pat. No. 4,354,691 to Queen's University, Kingston, issued Oct. 19, 1982, U.S. Pat. No. 4,560,181, issued Dec. 24, 1985 to Design Loft Inc., U.S. Pat. No. 3,189,368 to James F. Peterson, issued June 15, 1965, U.S. Pat. No. 3,994,509, issued Jan. 28, 1986 to Jerome E. Schaeffer, U.S. Pat. No. 4,453,729, issued June 12, 1984 to Wesley O. Lacken and Canadian Pat. No. 1,202,554, issued Apr. 1, 1986 to Akira Korosue and Canadian Pat. No. 1,026,662 issued Feb. 21, 1978 to Permobilstiftelsen.

All previously known devices used to propel a wheelchair with handle bars are very cumbersome, complicated, very heavy and require that the wheelchair has to undergo extensive and expensive alterations and changes to accommodate such devices or a completely new and special wheelchair has to be designed and manufactured at exorbitant cost in order to utilize the use of a hand lever propulsion system. The use of a hand lever propulsion system is very desirable as it provides a substantial power to propel the wheelchair, eliminates the tremendous stress and jolting of the arms and especially the shoulders and shoulder joints of the wheelchair user. This is a very severe problem, as documented by the discomfort and inflammation of the shoulder joints experienced by Rick Hanson on his world tour. Many patients confined to a wheelchair do not have the physical strength to propel the wheelchair by pushing the hand rail ring by hand and must rely on the assistance of a person pushing their wheelchair. Electrically propelled wheelchairs which could solve some of the problems, are exorbitantly expensive, heavy, require constant service and are difficult to transport.

OBJECTS OF INVENTION

The present invention provides a manually operable propulsion unit which is a self-contained unit and can be detachably attached to any type of hand rail pushed chair without alterations of the chair very quickly requiring a minimum of tools. Thus the unit can be transported to any desired place and quickly mounted on he wheelchair so as to convert the wheelchair so that it is propellable by the backwards and forwards motion of the hand levers of the propulsion unit in addition to be propellable directly by the hand rails.

SUMMARY OF INVENTION

According to the present invention there is provided a manually operable propulsion unit for detachable attachment to a wheelchair in which the wheels are arranged to be driven by circular hand rails fixedly attached, to concentric with and laterally spaced outside the wheels of the wheelchair comprising base member means adapted to be detachably attached transversely of the frame of said wheelchair, a pair of hand levers pivotably mounted about a horizontal axis of said base member means at either side of the wheelchair, a pair of linkage means each detachably connected between one said hand rail and said hand lever such that back and forward motion in a vertical plane of each of said hand levers drives its associated wheel of the wheelchair via its attached hand rail.

The present invention also provides a conversion kit for erection of a manually operable propulsion unit for detachable attachment to a wheelchair in which the wheels are arranged to be driven by circular hand rails fixedly attached to, concentric with and laterally spaced outside the wheels of the wheelchair, said kit comprising base member means adapted to be detachably attached transversely of the frame of said wheelchair, a pair of hand levers adapted to be pivotably mounted about a horizontal axis on said base member means at either side of the wheelchair, and a pair of linkage means each adapted to be detachably connected between one said handrail and said hand lever such that back and forwards motion in a vertical plane of each of said hand levers in the unit drives its associated wheel of the wheelchair via its attached handrail. Thus, in its broadest aspect the present invention provides a linkage means detachably attached to each said hand rail on the wheelchair and connecting said handrail with a hand lever pivotably mounted on a rigid base member adapted to be detachably attached across the frame of the wheelchair such that back and forwards motion of the hand lever in a vertical plane drives its associated wheel of the wheelchair via the attached hand rail.

According to an embodiment of the present invention there is provided a manually operable propulsion unit for detachable attachment to a wheelchair in which the wheels are arranged to be driven by circular hand rails fixedly attached to, concentric with and laterally spaced outwardly from the wheels of the chair comprising a pair of rigid support members each adapted to be detachably attached to one said hand rail within the periphery thereof, a rigid elongated member means adapted to be detachably attached transversely of the frame of said wheelchair, a pair of hand levers pivotally mounted about a horizontal axis of said base member means at either side of the wheelchair, a pair of mounting means each on one said rigid support member and a pair of rigid linkages each pivotally mounted at one end to one said mounting means at a point off-center from the center of the hand rail and to an intermediate point on said hand lever whereby the back and forwards motion in a vertical plane of each of said hand lever arm drives its associated wheel of the wheelchair via its attached handrail. Suitably the rigid support members are straight bars or other shaped cross-bars, such as Y-shaped and X-shaped depending on the type of the wheelchair and the location of the connections between the hand rail and the wheel of the wheelchair.

In a particularly desirable embodiment thereof the present invention provides a manually operable propulsion unit for detachable attachment to a wheelchair in which the wheels are arranged to be driven by circular hand rails fixedly attached to, concentric with and laterally spaced outside the wheels of the wheelchair comprising a pair of bars each adapted to be detachably attached dimetrically across one said hand rail, basebar means adapted to be detachably attached transversely of the frame of said wheelchair, a pair of hand lever bars pivotably mounted about a horizontal axis on said basebar means at either side of the wheelchair, a pair of mounting means each one of said crossbars extending across said hand rail and a pair of connecting bars each pivotably mounted at either end to said mounting means at a point off-center from the center of the hand rail and to an intermediate point on said hand lever bar whereby back and forwards motion in a vertical plane of each of said hand lever bars drives its associated wheel of the wheelchair via its attached hand rail. Suitably the mounting means is a plate fixedly attached to the bar extending across the hand rail. The crossbars adapted to be detachably attached dimetrically across the hand rail include adjustment means therein so as to be able to be force fitted across the internal faces of the hand rail by the adjustment means, which adjustment means preferably comprises a thread and nut means in the crossbar for varying its length. In particular the adjustment means desirably comprises a threaded adjustment bolt which slides into a hole drilled lengthwise into the center of the crossbar and an adjustment in length is made by turning the nut on the bolt. Alternatively a right and left turn thread is afixed to the adjustment nut to lengthen or shorten the crossbar to fit securely into a position across the inside of the hand rail. The crossbar suitably has a length of 1½ to 2 feet and is a 1½ to 2 inches square bar of aluminium or steel and has a thread and nut for adjustment to the diameter of the hand rail of the chair. Suitably the ends of the bar are semi-circularly recessed to accommodate the hand rail and more desirably one side of each end of the bar has a round dovetail so as to slide onto the bolts which attach the hand rail to the wheel of the wheelchair which prohibits the tendency of the bar to slide around the hand rail.

The mounting means is suitably a plate located at the center of the bar having a mounting hole for the end of the linkage bar at a distance from the centerpoint of the wheel. It is desirable that the plate has several holes at different distances from the centerpoint of the wheel, this gives stroke and leverage adjustment as desired by the occupant of the wheelchair. The lower end of the connecting bar is attached to the plate by a bolt and bushing.

In a further embodiment of the present invention the hand lever bar has means for attaching the connection at different points intermediate the end of the bar to provide for stroke length adjustment. Thus the hand lever bar which is suitably about 3 feet in length and 1½ inch square made of aluminium or steel bars is connected to the basebar by a plastic bushing or roller bearing for easy manoeuvreability. The length of the joint is usually 2 to 3 inches. The hand lever bars desirably include handles which are adjustable to extend vertically or horizontally from said lever bar. The handles on top of the hand lever bars are suitably plastic with a metal screw and can be changed to vertical to horizontal operating position by either screwing it on vertically or sideways as desired. The hand lever bars are suitably attached to a basebar suitably at the base at the front wheelchair frame in front of the big wheels and behind the small wheels. The basebar acts as a stabilizer to ensure stability of a folding wheelchair and acts on both sides as a base connection of the lever bar. The basebar is detachably clamped to the wheelchair frame, which clamps suitably have wing nuts for easy removal and mounting.

In a particularly desirable embodiment of the present invention in the lower rear frame of the wheelchair another basebar is clamped to provide cross stability, this having particularly good results with collapsible wheelchairs. The front and rear stabilizer basebar may have a center joint and two side joints and appropriate stabilizer clamps and thus will be foldable with the chair without the necessity of detaching the propulsion unit of the present invention. Alternatively the rear stabilizer basebar is suitably a longitudinally adjustable bar suitably by means of screw means therein which is located between the hubs of the large rear wheels of the chair. Alternatively the front base bar may have its central portion between the frame bars of the wheelchair similarly longitudinally extendable by screw means, the ends of the central portion between the frame bars of the wheelchair being removably located in socket end portions of the outer portions of the front basebar. Thus, the center portion can be removed for collapse of the wheelchair. The folding joints suitably have wing nuts for easy removal and mounting.

In another embodiment of the present invention the basebar means upon which the hand levers are pivotally mounted comprise a pair of base clamps adapted to be clamped on the frame of the wheelchair at transversely opposite sides thereof, each of the base clamps having a horizontally extending portion for pivotally mounting on the hand lever. These base clamps eliminate the necessity for having the basebar and also the stabilizer bar and thus significantly simplify the structure of the unit and with the absence of the basebar and the stabilizer bars the wheelchair folds without the necessity for removal and reattachment of such bars. Further, the unit may be attached to and removed from the wheelchair much more easily and quickly with the presence of these base clamps instead of the basebar.

According to this embodiment of the invention therefore there is provided a manually operable propulsion unit for detachable attachment to a wheelchair in which the wheels are arranged to be driven by circular hand rails fixedly attached, to concentric with and laterally spaced outside the wheels of the wheelchair comprising base member means adapted to be detachably attached transversely of the frame of said wheelchair, a pair of hand levers pivotally mounted about a horizontal axis of said base member means at either side of the wheelchair, a pair of linkage means each detachably connected between one said hand rail and said hand lever such that back and forward motion in a vertical plane of each of said hand levers drives its associated wheel of the wheelchair via its attached hand rail, said base member means comprising a pair of base clamps adapted to be clamped on the frame of the wheelchair at transversely opposite sides thereof, each said base clamps having a horizontally extending portion for pivotally mounting said hand lever.

The present invention also provides in this embodiment a conversion kit for erection of a manually operable propulsion unit for detachable attachment to a wheelchair in which the wheels are arranged to be driven by circular hand rails fixedly attached to, concentric with and laterally spaced outside the wheels of the wheelchair, said kit comprising base member means adapted to be detachably attached transversely of the frame of said wheelchair, a pair of hand levers adapted to be pivotally mounted about a horizontal axis on said base member each adapted to be detachably connected between one said hand rail and said hand lever such that back and forwards motion in a vertical plane of each of said hand levers in the unit drives its associated wheel of the wheelchair via its attached hand rail, said base member means comprising a pair of base clamps adapted to be clamped on the frame of the wheelchair at transversely opposite sides thereof, each said base clamps having a horizontally extending portion for pivotally mounting said hand lever.

In a preferred embodiment of the present invention each of the base clamps is adapted to be clamped between a pair of tubes on the frame of the wheelchair. Desirably each of the base clamps is adapted to be clamped between a pair of vertically spaced adjacent tubes on the frame of the wheelchair.

In a particular embodiment of the present invention each of the base clamps is L-shaped with an obtuse angle between the leg and foot portions with the leg and foot portions each being adapted to be clamped to one of the tubes of the frame of the wheelchair, the foot portion having a bearing for pivotably mounting the hand lever extending outwardly transversely therefrom. Suitably each of the base clamps is longitudinally split into a pair of symmetrical parts, each of the parts having on its inner surface recesses for accommodating the tube of the frame of the wheelchair and screw means for clamping the parts together around the tubes of the frame of the wheelchair. Preferably the screw means are wing bolts. However, it will be realized that the shape of the base clamp will depend on the particular structure of the frame of the wheelchair and the clamp may be of other shapes such as straight of L-shape.

The upper end of the connecting bar suitably extends into an in-slot in the middle of the hand lever bar and desirably a number of holes, suitably three or four holes, are located approximately $1\frac{1}{2}$ to 2 inches apart to allow for stroke length adjustment. The connecting bar, is suitably a flat crossbar, and is inserted and secured by a bolt into the selected hole in the slot in the lever bar for the desired stroke length. The crossbar is suitably of solid aluminium or steel of a $\frac{1}{4}$ inch thickness and $1\frac{1}{2}$ inches width and approximately $1\frac{3}{4}$ to 2 feet in length.

In a particularly desirable embodiment of the present invention a soft plastic shield covers the contours of the wheel and the hand rail and is stationarily fixed to the chair frame to prevent the hands of the occupant accidentally entering the stroke area of the hand lever bar. This ensures that the back part of the hand rail can be used for hand operation. Appropriate independent emergency hand brakes of conventional design may be attached at a convenient safe position with regard to the hand protection shield.

Thus, the present invention provides a manually operatable propulsion unit for detachable attachment to any type of hand rail pushed wheelchair without alterations to the wheelchair in a very few minutes, usually less than 5 minutes, no tools are required, unless for convenience a simple wrench may be used. The unit is light weight, weighing approximately about 4 lbs. and adds only a small amount, such as an inch, to the width of the chair and therefore poses no problems in getting through normal door openings or operating in confined spaces. The propulsion unit is of utmost simplicity and reliabiltiy and virtually maintenance free. The unit in kit form can easily be taken on journeys, by plane or bus, etc., by carrying it in a light plastic carrying bag approximately one tenth the size of a golf bag. The wheelchair can be left at the beginning of the journey and any other similar wheelchair can take its place at the end of the trip. Upon arrival at the ravel destination the unit can be easily attached to any rented or otherwise provided hand rail driven wheelchair by simply changing the length of the basebars and the adjustable length of the crossbar. The steering works on the same principle as maneuvering a conventional wheelchair pushing the hand rail. Especially elderly and weaker patients can use the unit easily and without assistance. Because of the very easy and continuous forward and backward movement of the lever bars this provides constant gentle exercise to the arm and shoulder muscles. This is of great therapeutic value.

The marked improvement in the independence and mobility of the patient through use of this unit will have a very positive effect on the psycological welfare of the patient.

The handles can be positioned straight upward or level to the left or right to supply a grip position for the hands and, at the same time, can provide a resting support for the hands. The device propels the wheelchair forward and backward and steering the wheelchair by holding back or accelerating the movement of the lever bars, or halting the movement of the hand lever bars completely to stop the wheelchair. The unit is very simple and does not require any service or maintenance.

DESCRIPTION OF DRAWINGS

The present invention will be further illustrated by way of the accompanying drawings, in which like reference numbers denote like parts and in which.

DESCRIPTION OF PREFERRED EMBODIMENTS OF INVENTION

Figure 1:
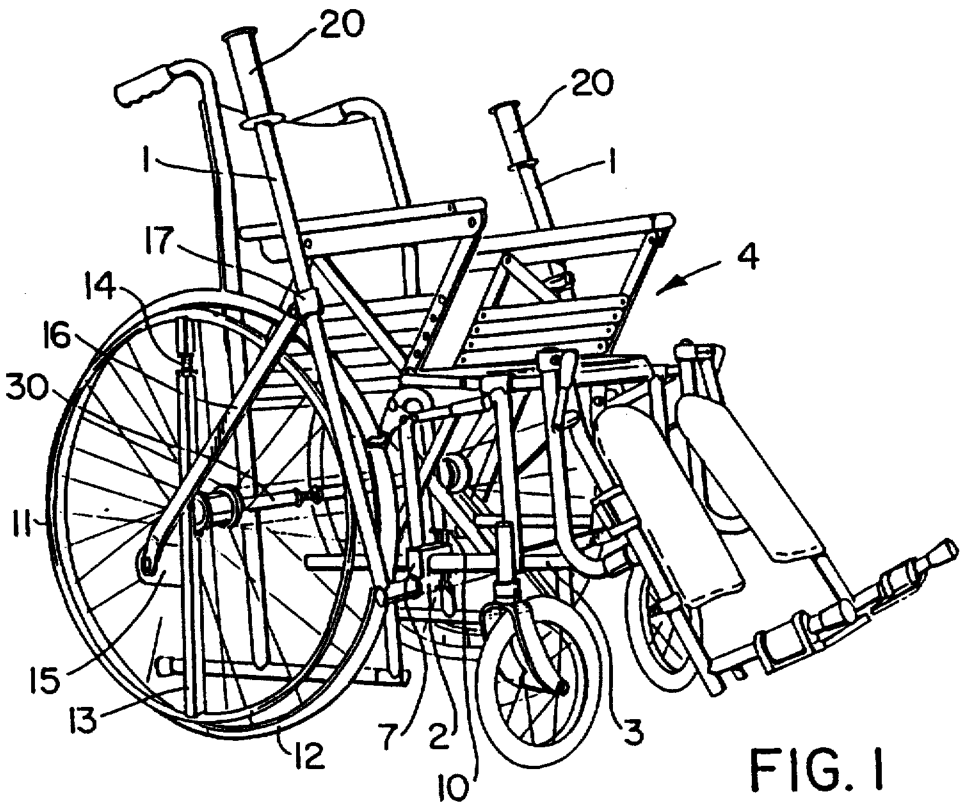
FIG. 1 is a perspective view of the wheelchair including the manually operable propulsion unit according to a preferred embodiment of the present invention.

Referring to FIGS. 1 to 9, the manually operable propulsion unit comprises a pair of vertically extending hand lever bars 1 pivotably mounted at their bottom ends to the ends of a basebar 2 extending across the frame 3 of the wheelchair 4 such that the occupant of the wheelchair 4 can provide back and forwards motion in a vertical plane of the hand lever bars 1. As seen particularly from FIG. 4 the basebar 2 has at its ends spigots 5 on which sleeves 6 on the ends of the lever bars 1 rotate. Sleeves 6 are held by spring cotter pins (not shown), their rotation facilitated by plastic bushings extending the full length of the sleeves 6. A washer is located on each side of the sleeves 6. The upper end of each lever bar 1 has a rubber grip handle 20.

The basebar 2 is detachably clamped across the frame 3 of the wheelchair 4 by means of hinge clamps 7, the side of the clamps nearest to the ends of the basebar 2 having a hinge 9 (FIG. 4) and the other side being releasably tied down by a T-bolt screw 10. The top part of the T-bolt 10 is suitably 4 inches wide and provides enough leverage to securely clamp the basebar 2 to the wheelchair frame 3 without the use of tool. Thus, the basebar 2 is clamped to and under the wheelchair frame 3 across the wheelchair 4 in front of the big wheels and behind the small wheels. There are approximately 5 inches of frame 3 on which the basebar 2 can be moved forwardly and backwardly thereby adjusting the handle position and the stroke length of the lever bar 1.

Figure 3:
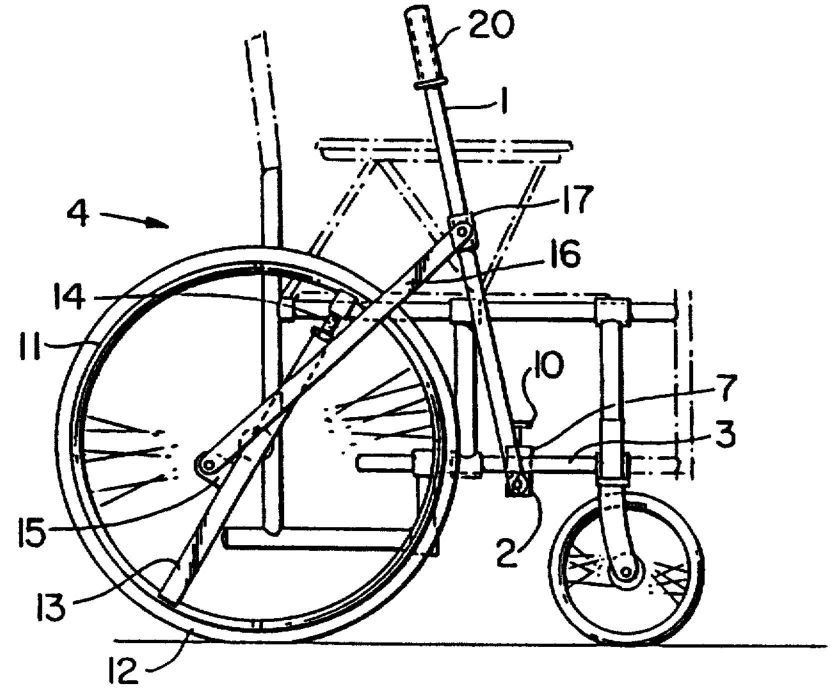
FIG. 3 is a side elevation of the wheelchair of FIG. 1.
Figure 4:
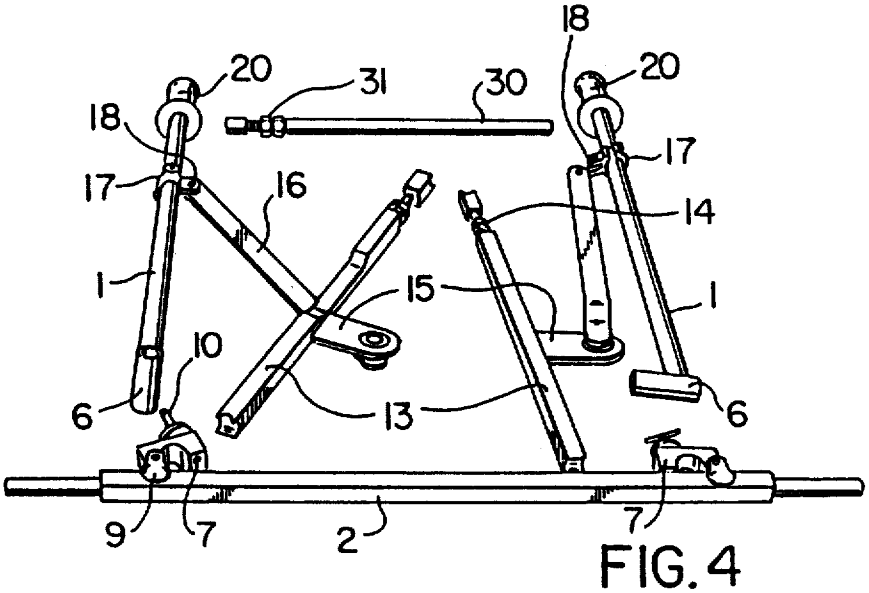
FIG. 4 is a plan view of the parts forming the conversion kit for the erection of the manually operable propulsion unit of the wheelchair of FIG. 1.

Extending across the circular handrail 11 of the wheelchair 4 by which the wheels 12 of the wheelchair 4 are normally driven is a crossbar 13 which is shown in FIGS. 1, 3 and 4 is a straight bar. The crossbar 13 is securely fastened by turning the nut of an extension bolt 14 in the crossbar 13. The crossbar 13 has a mounting plate 15 fixedly attached thereto having a mounting hole therein which is off-center from the hub of the wheel 12 of the wheelchair 4 and also from the handrail 11.

Figure 9:
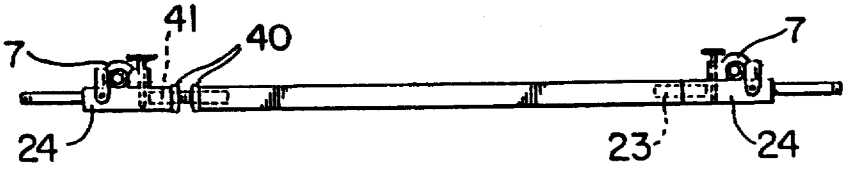
FIG. 9 is front elevation of a further embodiment of the front basebar in the wheelchair of FIG. 1.
Figure 2:
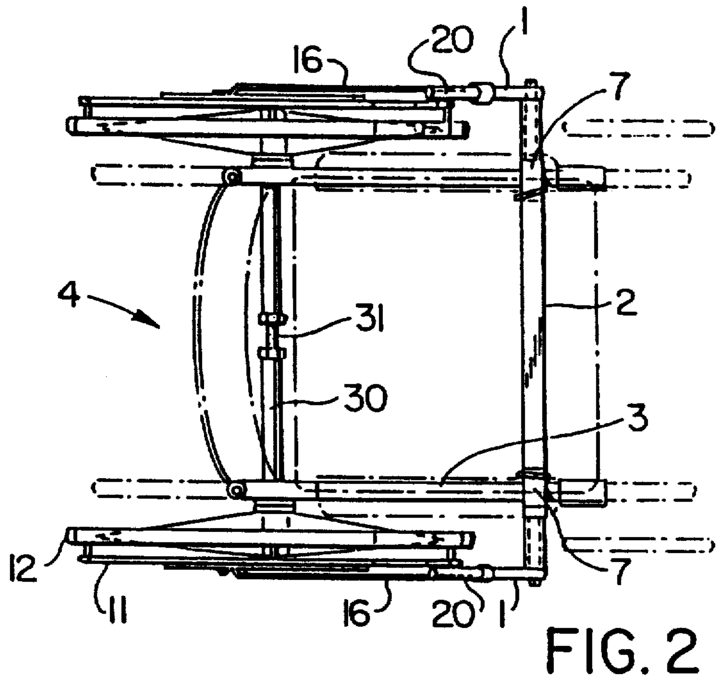
FIG. 2 is a plan view of the wheelchair of FIG. 1.

Extending between the lever bar 1 and the mounting plate 15 is a connecting bar 16. A sliding connecting clamp 17 is attached to the lever bar 1 and the connecting bar 16 is attached into a receiving slot 18 of the connecting clamp 17 and is held in place by a bolt. The connecting clamp 17 can be moved up and down the lever bar 1 thereby adjusting the stroke length and leverage to any desired position required by the occupant of the wheelchair 4. The connecting bar 16 can move freely as required by the circumference of the circle described by the mounting plate 15 of the crossbar 13. The distance of the point of attachment of the connecting bar 16 to the mounting plate 15 on the crossbar 13 from the center of the wheel 12 and the off-center distance of the point of attachment in relation to the imaginary center crosslines are of vital importance as the particular position produces the zero leverage distance which the propulsion unit has to overcome to approximately 1 inch instead of approximately 6 inches necessary if the connecting bar 16 were attached directly to the crossbar 13 and not off-center. It will be recognized that the propulsion unit has a mirror image structure on each side of the wheelchair 4 and that each of the hand lever bars 1 can be operated independently of the other and thus the wheelchair 4 can be guided by the mode of the operation of the hand lever bars 1. It will be further recognized that the propulsion of the present invention can be attached to any standard hand rail driven wheelchair 4 and thus the structure of the wheelchair although shown in FIGS. 1 and 10 in detail and in FIGS. 2 and 3 in dotted outline does not form a critical part of the present invention and therefore has not been described in detail. The propulsion unit of the present invention can be used with both folding and permanently expanded wheelchairs. However, for use with folding wheelchairs it is not necessary to remove the propulsion unit of the present invention in order to fold the wheelchair. It is only desirable to completely remove the propulsion unit of the present invention when it is desired to transport it to another location to attach it to another wheelchair. Thus, in accordance with FIGS. 7 and 8 the basebar 2 is collapsible by means of folding joints 21 which are covered by sleeves 22 which allow the basebar 2 to be folded with the wheelchair. Alternatively as shown in FIG. 9 the central portion of the basebar 2 inside the clamps 7 is detachable therefrom and is extendable by means of a turning nut and an extension bolt so as to be fitted onto spigots 23 on the ends 24 of the bar 2 which remain clamped by clamps 7 to the frame 3 of the wheelchair. Further a stabilizer bar 30 which is an extendable bar by the turning of the nut of the extension bolt 31 is located between the two main wheel hubs inside and under the wheelchair seat and tightened to provide proper cross stabilization on a folding wheelchair. On a non-folding wheelchair the stabilizer bar 30 is not required.

Figure 5:
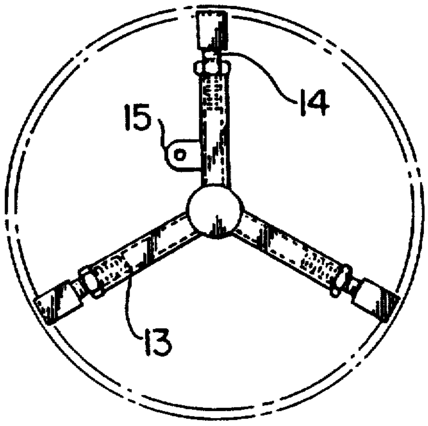
FIG. 5 is an alternative embodiment of the crossbar in FIG. 1.
Figure 6:
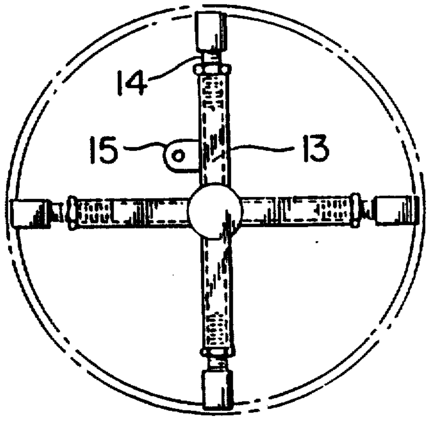
FIG. 6 is a further alternative embodiment of !he crossbars in FIG. 1.
Figure 7:
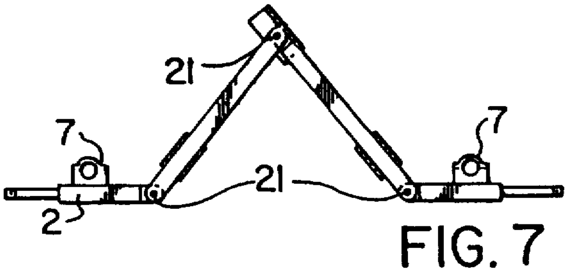
FIG. 7 and FIG. 8 are front elevations of an alternative embodiment of the front basebar in the wheelchair in FIG. 1, FIG. 7 being in the folded condition and FIG. 8 in the extended condition.
Figure 8:
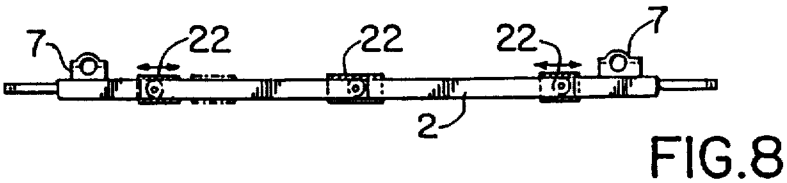

For wheelchairs with air tires there are usually more than four bolts holding the hand rail 11 to the main wheel 12. For such wheelchairs, as shown in FIGS. 5 and 6, the crossbar 13 may be Y-shaped and this generally covers any and all known hand rail designs. Alternatively it can be X-shaped as shown in FIG. 6.

In order to detach the manual propulsion unit from the wheelchair the spring cotter pin is firstly pulled from the basebar 2 and the lever bar 1 is then removed from the basebar 2. The crossbar 13 is then loosened and slid out from the hand rail 11. The basebar clamps 7 are then opened and the basebar 2 is then removed. If the stabilizer bar 30 is present as with a folding wheelchair it is loosened by means of the nut and slid out. The hand lever bar 1, the connecting bar 16 and the crossbar 13 remain assembled and folded together for transport while off the wheelchair. In order to reattach the manual propulsion unit to the wheelchair the above procedure is reversed. Such procedures take approximately 2 minutes each. All the expansion bolts on the respective bars can be easily hand tightened and require only one-quarter further turn with a small wrench which fits all the adjusting nuts on the propulsion unit.

Figure 10:
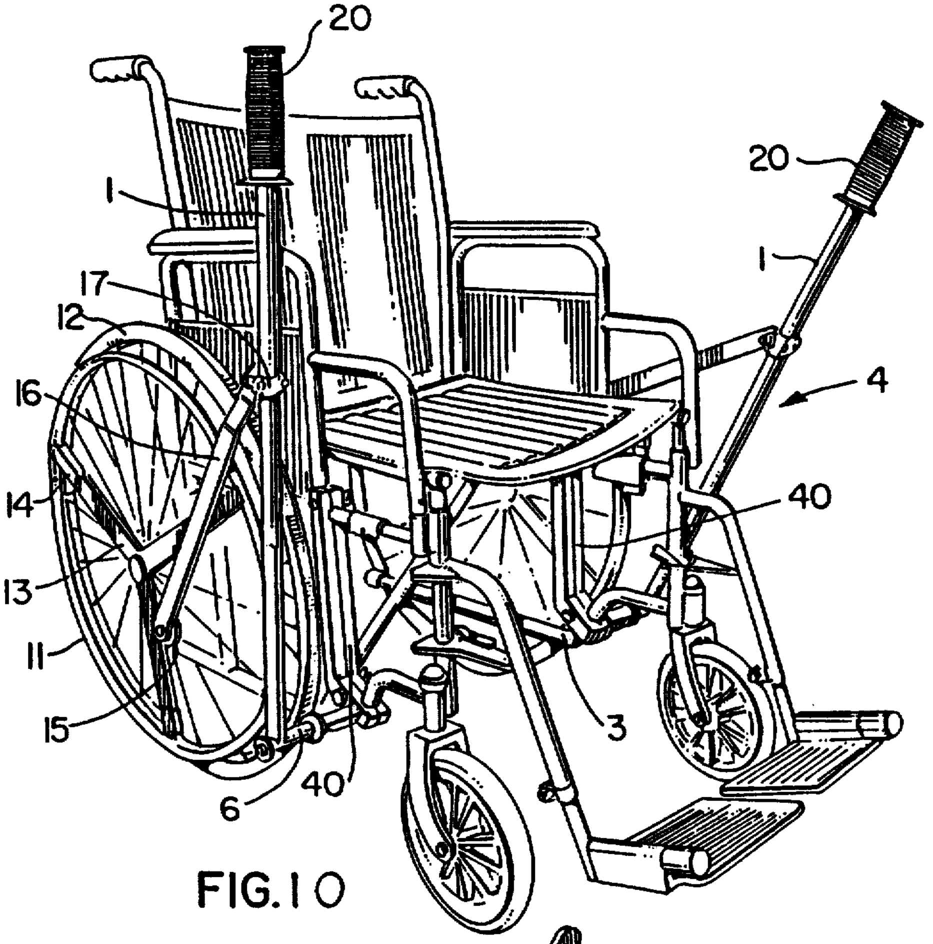
FIG. 10 is a perspective view of a wheelchair including the manually operable propulsion unit including a base clamp according to another preferred embodiment of the present invention.
Figure 11:
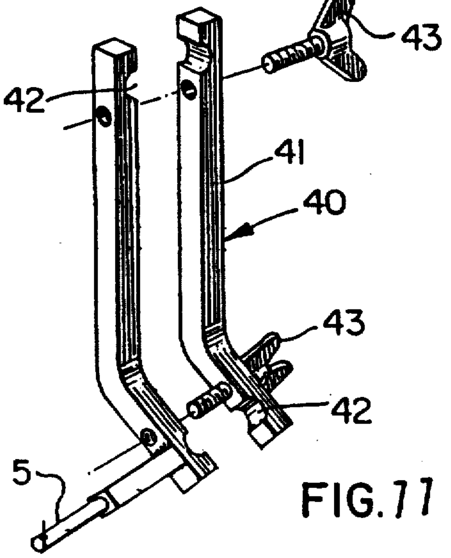
FIG. 11 is an exploded side elevation of the base clamp as shown in FIG. 10.

Referring to FIGS. 10 and 11, each lever bar 1 is pivotaby mounted end to end of a base clamp 40 mounted in the frame 3. As seen particularly from FIG. 11 each the base clamp 2 has at its end a spigot 5 on which a sleeve 6 on the end of each lever bar 1 rotates. Sleeve 6 is held by spring cotter pin (not shown), its rotation facilitated by a plastic bushing extending the full length of the sleeve 6. A washer is located on each side of the sleeve 6.

As shown in FIG. 11 the base clamp 40 is of L-shaped configuration and is longitudinally split to a pair of symmetrical members 41 having recesses 42 on the facing surfaces adjacent the ends thereof to accommodate the tubes of the frame 3 of the wheelchair 4. The symmetrical members 41 are clamped together over vertically adjacent tubes of the frame 3 of the wheelchair chair 4 by means of wing bolts 43 such that the spigots 5 extend outwardly transversely of the frame 3 of the wheelchair 4 and are suitably in alignment. While the base clamp 40 is shown as L-shaped with an obtuse angle between the leg and foot portions depending on the structure of the frame 3 of the wheelchair 4, the base clamp may be of other shapes so as to be clamped between adjacent tubes of the frame 3 of the wheelchair 4 and may, for example, be straight or of T-shaped configuration and may, of course, be clamped between more than two tubes of the frame 3 of the wheelchair 4.

Each base clamp 40 is clamped to the wheelchair frame 3 in front of the big wheels and behind the small wheels. There are approximately 5 inches of frame 3 on which the base clamp 40 can be moved forwardly and backwardly thereby adjusting the handle position and the stroke length of the lever bar 1.

Extending across the circular hand rail 11 of the wheelchair 4 by which the wheels 12 of the wheelchair 4 are normally driven is a Y-shaped bar 13. The Y-shaped bar 13 is securely fastened by turning a nut of an extension bolt 14 in the bar 13. The bar 13 has a mounting plate 15 fixedly attached thereto having a mounting hole therein which is off-center from the hub of the wheel 12 of the wheelchair 4 and also from the hand rail.

Extending between the lever bar 1 and the mounting plate 15 is a connecting bar 16. A sliding connecting clamp 17 is attached to the lever bar 1 and the connecting bar 16 is attached into a receiving slot of the connecting clamp 17 and is held in place by a bolt. The connecting clamp 17 can be moved up and down the lever bar 1 thereby adjusting the stroke length and leverage to any desired position required by the occupant of the wheelchair 4. The connecting bar 16 can move freely as required by the circumference of the circle described by the mounting plate 15 of the Y-shaped bar 13. The distance of the point of attachment of the connecting bar 16 to the mounting plate 15 on the Y-shaped bar 13 from the center of the wheel 12 and the offcenter distance of the point of attachment in relation to the imaginary center crosslines are of vital importance as the particular position produces the zero leverage distance which the propulsion unit has to overcome to approximately 1 inch instead of approximately 6 inches necessary if the connecting bar 16 were attached directly to the Y-shaped bar 13 and not off-center. It will be recognized that the propulsion unit has a mirror image structure on each side of the wheelchair 4 and that each of the hand lever bars 1 can be operated independently of the other and thus the wheelchair 4 can be guided by the mode of the operation of the hand lever bars 1. It will be further recognized that the propulsion of the present invention can be attached to any standard hand rail driven wheelchair 4 and thus the structure of the wheelchair does not form a critical part of the present invention can be used with both folding and permanently expanded wheelchairs. However, for use with folding wheelchairs it is not necessary to remove the propulsion unit of the present invention in order to fold the wheelchair. It is only desirable to remove the propulsion unit of the present invention when it is desired to transport it to another location to attach it to another wheelchair.

For wheelchairs with air tires there are usually more than four bolts holding the hand rail 11 to the main wheel 12. For such wheelchairs, as shown in FIG. 10 the bar 13 may be Y-shaped and this generally covers any and all known hand rail designs. Alternatively it can be X-shaped.

To remove the whole unit from the wheelchair 4, only two wing bolts 42 on each side have to be taken off to remove the base clamps 40. Then the extension bolts 14 on the two Y-crossbars 13 have to be loosened to remove the whole propulsion unit from the wheelchair 4. No tools are required, because everything is adequately secured by hand tightening. This has also reduced the weight of the unit. The removal and reattachment time has been reduced to a maximum of 3 minutes.

I claim:

1. A manually operable propulsion unit for detachable attachment to a conventional wheelchair having a frame with a front and a rear, and having two large wheels with hubs, in which each wheel of the wheelchair is arranged to be driven by a circular hand rail housing a center point fixedly attached to, concentric with and laterally spaced outside the wheel, said propulsion unit comprising base member means adapted to be detachably attached transversely to the frame of said wheelchair, a pair of hand levers pivotably mounted to said base member means about a horizontal axis of said base member means at either side of the wheelchair, a pair of rigid support members, each rigid support member being adapted to be detachably attached to one of said hand rails within the periphery thereof, mounting means on each said rigid support member and a pair of rigid linkages, each pivotably mounted on one end of said mounting means at a point off-center from the center of said hand rail and to an intermediate point on said hand lever whereby back and forwards motion in a vertical plane of each of said hand levers drives its associated wheel of the wheelchair via its attached hand rail.

2. A unit according to claim 2, in which each rigid support member is a bar means adapted to extend across the hand rail.

3. A unit according to claim 3, in which the bar means is a straight bar.

4. A unit according to claim 2, in which the bar means is an X-shaped bar.

5. A unit according to claim 1, in which said base member means comprises a pair of base clamps adapted to be clamped on the frame of the wheelchair at transversely opposite sides thereof, each said base clamps having a horizontally extending portion for pivotally mounting said hand lever.

6. A unit according to claim 5, in which each of the base clamps is adapted to be clamped between a pair of tubes on the frame of the wheelchair.

7. A unit according to claim 6, in which each of the base clamps is adapted to be clamped between a pair of vertically spaced adjacent tubes on the frame of the wheelchair.

8. A unit according to claim 7, in which each of the base clamps is L-shaped with an obtuse angle between a leg and a foot portion with the leg and foot portions each being adapted to be clamped to one of the tubes of the frame of the wheelchair, the foot portion having a bearing for pivotably mounting the hand lever extending outwardly transversely therefrom.

9. A unit according to claim 8, in which each of the base clamps is longitudinallly split into a pair of symmetrical parts, each of the parts having on its inner surface recesses for accommodating the tube of the frame of the wheelchair and screw means for clamping the parts together around the tubes of the frame of the wheelchair.

10. A unit according to claim 9 in which the screw means are wing bolts.

11. A unit according to claim 2, in which the bar means is a Y-shaped bar.

12. A unit according to claim 1 wherein each rigid support member comprises a crossbar, said base member means comprises a basebar means and each of said rigid linkages comprises a connecting bar.

13. A unit according to claim 12, in which the mounting means is a plate fixedly attached to said crossbar.

14. A unit according to claim 12, in which the basebar means is a basebar having a middle and two ends arranged to be detachably attached across the base of the front of the frame of the wheelchair and includes a further basebar having a middle and two ends detachably attachable across a base of the rear of the frame of the wheelchair.

15. A unit according to claim 14, in which the front basebar includes joints in the middle and adjacent the ends so as to be collapsible with the wheelchair.

16. A unit according to claim 15, in which the rear basebar is longitudinally adjustable by screw means and is locatable between the hubs of the large rear wheels of the wheelchair.

17. A unit according to claim 14, in which a central portion of the front basebar, having two ends is longitudinally adjustable by screw means, the ends of the central portion being removably located in sockets on an outer portion of the front basebar.

18. A unit according to claim 12, in which the crossbar is adapted to be force fitted across an internal face of the hand rail by an adjustment means.

19. A unit according to claim 18, in which the adjustment means comprises a thread and nut means in the crossbar for varying its length.

20. A unit according to claim 18, in which the crossbar has semi-circular recessed ends to accommodate the hand rail.

21. A unit according to claim 20, in which a side of each end of the crossbar has a round dovetail to slide onto bolts which attach the hand rail to the wheel whereby to prevent the crossbar sliding around the hand rail.

22. A unit according to claim 12, in which the plate has means for attachment the connecting bar at different distances from the centerpoint of the handrail to provide for stroke and leverage adjustment.

23. A unit according to claim 21, in which the hand lever bar has means for attaching the connecting bar at different points intermediate the ends of the connecting bar to provide for stroke length adjustment.

24. A unit according to claim 12, in which the basebars are detachably clamped to the frame.

25. A unit according to claim 12 in which the hand levers are pivotably connected to the crossbars by at least one of a plastic bushing and a roller bearing.

26. A unit according to claim 12 in which the hand levers include handles which are adjustable to extend perpendicularly from said hand lever.

27. A unit according to claim 12 including a shield adapted to be detachably attached to either side of the wheelchair to prevent the occupant from accidentally entering the stroke area of the hand lever.

28. The wheelchair equipped with a propulsion unit according to claim 1.

29. A wheelchair equipped with a propulsion unit according to claim 5.

30. A wheelchair equipped with a propulsion unit according to claim 8.

31. A conversion kit for erection of a manually operable propulsion unit for detachable attachment to a wheelchair in which each of the wheels is arranged to be driven by a conventional circular hand rail fixedly attached to, concentric with and laterally spaced outside the wheel of the wheelchair, said kit comprising base member means adapted to be detachably attached transversely of the frame of said wheelchair, a pair of hand levers adapted to be pivotally mounted about a horizontal axis on said base member means at either side of the wheelchair, a pair of rigid support members each rigid support member being adapted to be detachably attached to one of said hand rails within the periphery thereof, mounting means on each rigid support member and a pair of rigid linkages, each rigid linkage being adapted to be pivotably mounted on one end of said mounting means at a point off-center from the center of said hand rail and to an intermediate point on said hand lever whereby back and forwards motion in a vertical plane of each of said hand levers in the unit drives its associated wheel of the wheelchair via its attached hand rail.

32. A kit according to claim 31, in which each rigid support member is a bar means adapted to extend across the hand rail.

33. A kit according to claim 32, in which the bar means is a straight bar.

34. A kit according to claim 32, in which the bar means is an X-shaped bar.

35. A kit according to claim 31, in which said base member means comprises a pair of base clamps adapted to be clamped on the frame of the wheelchair at transversely opposite sides thereof, each said base clamps having a horizontally extending portion for pivotally mounting said hand lever.

36. A kit according to claim 35, in which each of the base clamps is adapted to be clamped between a pair of tubes on the frame of the wheelchair.

37. A kit according to claim 36, in which each of the base clamps is adapted to be clamped between a pair of vertically spaced adjacent tubes on the frame of the wheelchair.

38. A kit according to claim 37, in which each of the base clamps is L-shaped with an obtuse angle between a leg and a foot portion with the leg and foot portions each being adapted to be clamped to one of the tubes of the frame of the wheelchair, the foot portion having a bearing for pivotally mounting the hand lever extending outwardly transversely therefrom.

39. A kit according to claim 38, in which each of the base clamps is longitudinally split into a pair of symmetrical parts, each of the parts having on its inner surface recesses for accommodating the tube of the frame of the wheelchair and screw means for clamping the parts together around the tubes of the frame of the wheelchair.

40. A kit according to claim 39, in which the screw means are wing bolts.

41. A kit according to claim 32, in which the bar means is a Y-shaped bar.

42. A kit according to claim 31 wherein each rigid support member comprises a crossbar, said base member means comprises a basebar means and each of said rigid linkages comprises a connecting bar.

43. A kit according to claim 42, in which the mounting means is a plate fixedly attached to said crossbars.

44. A kit according to claim 43, in which the basebar means is a basebar having a middle and two ends arranged to be detachably attached across the base of the front of the frame of the wheelchair and includes a further stabilizing crossbar having a middle and two ends detachably attachable across the base of the rear of the frame of the wheelchair.

45. A kit according to claim 44, in which the front basebar includes joints in the middle and adjacent the ends so as to be collapsible with the wheelchair.

46. A kit according to claim 45, in which the stabilizing crossbar is longitudinally adjustable by screw means and is locatable between the hubs of the large rear wheels of the wheelchair.

47. A kit according to claim 44, in which a central portion of the front basebar having two ends is longitudinally adjustable by screw means, the ends of the central portion being removably located in sockets on an outer portion of the front basebar.

48. A kit according to claim 43, in which the crossbar is adapted to be force fitted across an internal face of the hand rail by adjustment means.

49. A kit according to claim 48, in which the adjustment means comprises a thread and nut means in the crossbar for varying its lengths.

50. A kit according to claim 49, in which the crossbar has semi-circular recessed ends to accommodate the hand rail.

51. A unit according to claim 50 in which a side of each end of the crossbar has a round dovetail to slide onto bolts which attach the hand rail to the wheel whereby to prevent the crossbar sliding around the hand rail.

52. A kit according to claim 42, in which the plate has means for attaching the connecting bar at different distances from the centerpoint of the hand rail to provide for stroke and leverage adjustment.

53. A kit according to claim 52, in which the hand lever bar has means for attaching the connecting bar at different points intermediate the ends of the connection bar to provide for stroke length adjustment.

54. A kit according to claim 42, in which the crossbars are adapted to be detachably clamped to the frame.

55. A unit according to claim 42 in which the hand levers are pivotably connected to the crossbars by at least one of a plastic bushing and a roller bearing.

56. A unit according to claim 48 in which the hand levers include handles which are adjustable to extend perpendicularly from said hand lever.

57. A unit according to claim 42 including a shield adapted to be detachably attached to either side of the wheelchair to prevent the hands of the occupant from accidentally entering the stroke area of the hand lever.

* * * * *